United States Patent [19]

Shortridge

[11] 4,205,395
[45] May 27, 1980

[54] DEPTH RECORDER

[75] Inventor: Edward J. Shortridge, Coral Gables, Fla.

[73] Assignee: Shakespeare Marine Electronics, Inc., Miami, Fla.

[21] Appl. No.: 958,743

[22] Filed: Nov. 8, 1978

[51] Int. Cl.² ........................... G01S 9/70; G01S 7/60
[52] U.S. Cl. .................................. 367/115; 367/108; 367/97; 346/33 EC; 346/76 PH
[58] Field of Search ................... 340/3 F; 346/33 EC, 346/76 PH

[56] References Cited

U.S. PATENT DOCUMENTS

| | | | |
|---|---|---|---|
| 3,942,149 | 3/1976 | Westfall, Jr. ........................ | 340/3 F |
| 3,986,011 | 10/1976 | Poole et al. ........................ | 346/33 R |
| 4,038,664 | 7/1977 | Muir .................................. | 346/33 A |
| 4,096,484 | 6/1978 | Ferre et al. ..................... | 346/33 EC |

*Primary Examiner*—Richard A. Farley
*Attorney, Agent, or Firm*—Ernest H. Schmidt

[57] ABSTRACT

A microprocessor-controlled depth recorder wherein strip chart recording is effected by use of a thermal printing head and wherein the microprocessor is programmed for the selective printing of any one of a plurality of depth ranges and the optional simultaneous printing of chart scale data and alphanumeric indicia along with echo soundings. For high resolution printing, the thermal printing head comprises 110 resistive elements, multiplexing being utilized to reduce the resistive element driving circuits from 110 to 21 by dividing the 110 resistive elements into 10 groups of 11 dots each.

7 Claims, 6 Drawing Figures

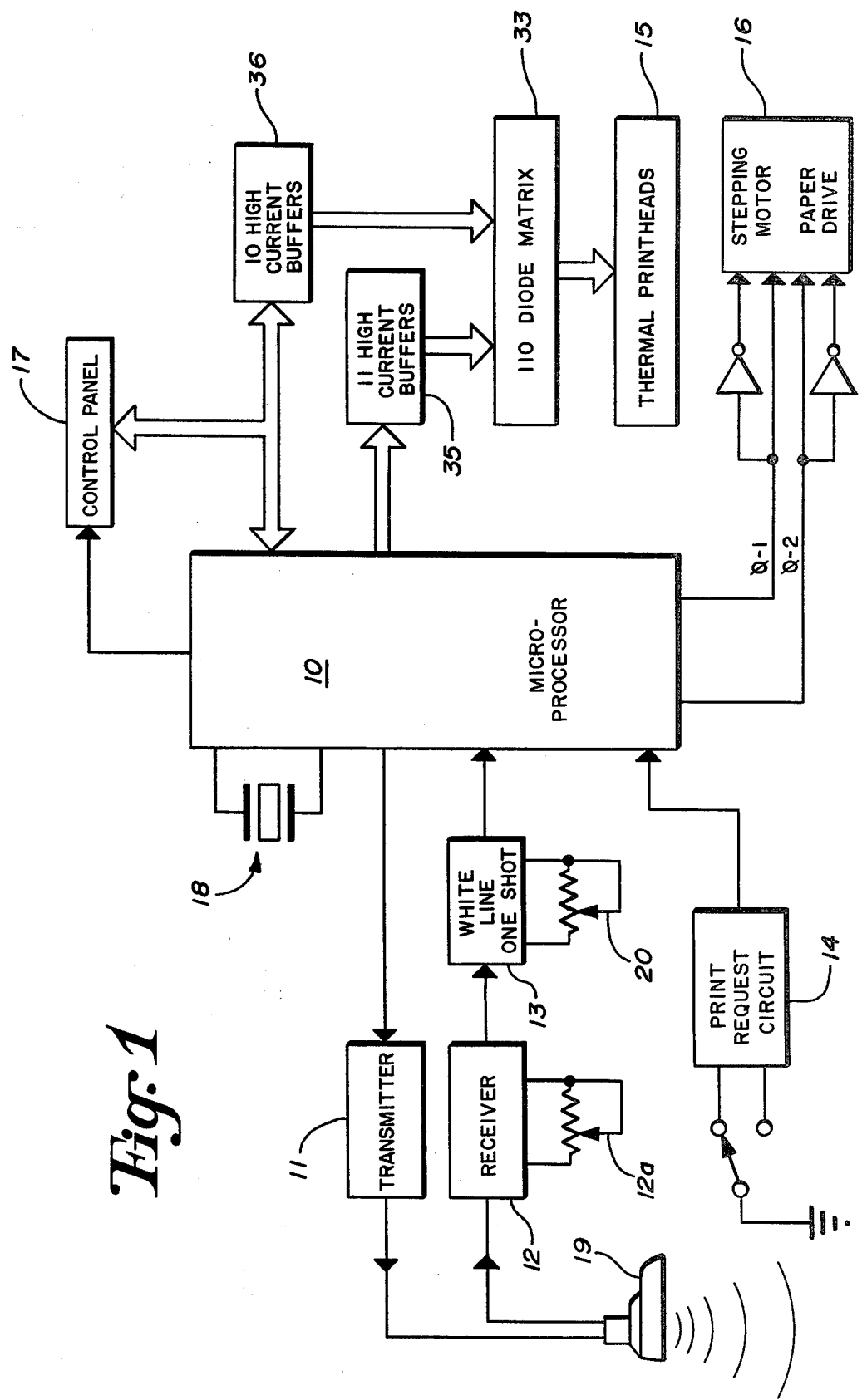

DEPTH RECORDER

FIELD OF INVENTION

This invention relates to aquatic depth sounding and recording systems such as used in bottom and fish depth sounding and measuring systems, and is directed particularly to a depth recorder/fish finder device wherein printing of the strip chart record is effected by a thermal printing head controlled by a microprocessor programmed for electronic scaling of the chart for selective ranging of various fractional depth zones for magnified observation of selected areas.

DESCRIPTION OF THE PRIOR ART

Depth recording systems utilizing high frequency sound pulses transmitted down through the water for reflection at various depths depending upon the objects intercepted, such as fish for example or bottom surface materials, and wherein such reflected signals are detected for measurement of time delay as an indicator of distance to the reflecting objects, are known. Such depth recorders heretofore devised, however are deficient in various respects, principally in that their electronic control systems and recording mechanisms are intricate and therefore subject to electrical and mechanical failure. Other systems heretofore devised utilized grid-printed chart paper to which the printing mechanism was necessarily independently calibrated to achieve the desired accuracy of print-out.

SUMMARY OF THE INVENTION

The principal object of this invention is to substantially reduce the mechanical complexity of depth sounding devices heretofore devised, while at the same time otherwise simplifying construction of the electronic circuitry by utilization of a microprocessor programmed for controlling the various operational functions of the system.

Another object of the invention is to provide a novel and improved depth recorder of the above nature utilizing thermal print-head means for printing along the chart paper, the thermal print-head being so designed and controlled by the microprocessor as to provide for simultaneous printing of chart scale date and alphanumeric indicia along with echo soundings.

Still another object of the invention is to provide a computerized depth recorder of the above nature including manual control means for selectively switching to various ranges of depth sounding being recorded, thereby providing for magnified display of selective underwater areas or zones.

In accordance with the aforementioned objects, a microprocessor is programmed to key a transmitter, causing an ultrasonic transducer immersed in the water to produce a pulse of ultrasonic energy. The ultrasonic pulse travels in a downward direction through the water until it finds a target which is opaque to ultrasound, thereby causing a portion of the ultrasonic energy to be reflected back to the transducer where it is transferred to the receiving portion of the range finder. The receiver circuitry amplifies the echo signal and further processes it so as to produce a well defined pulse output used to signal the microprocessor that a target has been detected. Under the program control, the microprocessor computes the time delay of the echo pulse with respect to the time at which the transmitted was keyed, and thereby determines the distance of the target from the transducer. This determination is done for all the received echoes and stored in the internal random access memory. During another portion of the transmit cycle, the microprocessor control unit interrogates the front panel controls to determine how the echo data is to be presented, and with this information, the echoes to be presented are selected, the output data is formated, and an output occurs in the form of a dot on a thermally sensitive chart paper. Other output information which is determined by the front panel controls includes selective print-out of the currently preselected range and grid marks. Upon completion of the output subroutine, the control unit determines if the chart paper is to be advanced or not, and if it is to be advanced it does so by sending properly timed pulses to a stepping motor. After completion of all of the above routines, the control unit is ready for a new transmit cycle.

Other objects, features and advantages of the invention will be apparent from the following description when read with reference to the accompanying drawings. In the drawings, wherein like reference numerals denote corresponding parts throughout the several views:

FIG. 1 is a block diagram of a typical microprocessor-controlled depth recorder system embodying the invention;

DETAILED DESCRIPTION OF THE INVENTION

Figure 4:
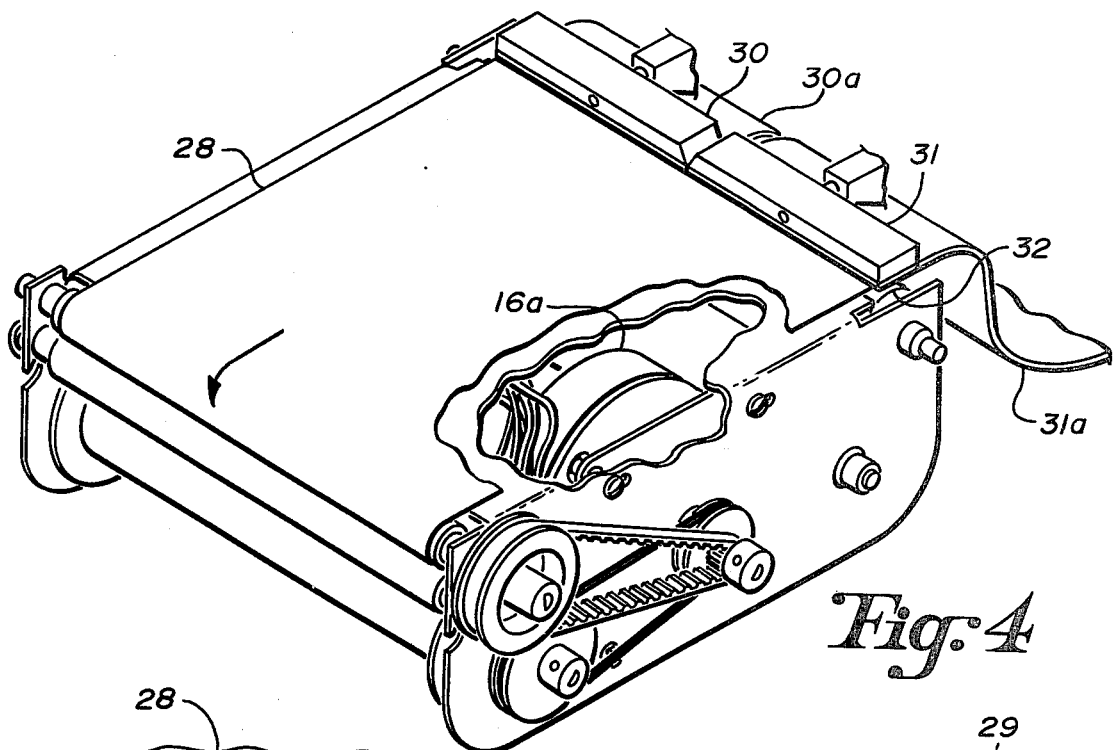
FIG. 4 is an oblique view of the chart paper transport, shown separately, and the associated thermal print-head assembly

As illustrated in FIG. 1 of the drawings, the depth recorder system comprises an electronic section consisting of a microprocessor control unit 10, transmitter 11, a receiver 12 with adjustable gain 12a, a "white line" monostable multivibrator 13, a "print" request circuit 14, thermal printing head matrix 15, stepping motor driving circuitry 16 and a control panel 17.

The microprocessor control unit 10 consists of an MK-3870 single chip microcontroller. This device contains 2K bytes of ROM and 64 bytes of RAM on chip; it provides up to 32 lines of input/output, programmable timer on chip with single supply operation. The timing of the MK-3870 is crystal controlled by a 3.9384 MHz quartz crystal 18 to provide the necessary accuracy and stability for all the timing functions of this application. Programming of the on board ROM in the MK-3870 provides all the necessary instructions for the microprocessor to control the operation of the depth finder as illustrated by the flow diagram of FIG. 1. The selection of a single chip microprocessor greatly reduces the parts count, thereby increasing the reliability and cost effectiveness of the design.

The transmitter receiver section 12 is of conventional design and uses solid state components throughout. The transmitter 11 may, by way of example, consist of a keyed oscillator, a push-pull power amplifier and a balanced, line matching transformer (not illustrated). The transmitter power output to the ultrasonic transducer is approximately 150 watts, pulse-RMS. Approximately 500 volts peak-to-peak is obtained across one side of the output transformer winding with a properly matched transducer assembly 19. The transmitter is keyed for 200 microseconds by the MK-3870 microprocessor.

The receiver section 12 may, by way of example, consist of an input matching coil, two tuned gain stages, an envelope detector, a short duration gain reduction circuit and a pulse width filter stage (not illustrated). In operation, the input matching coil steps up the signal from the low impedance winding of the output transformer, providing adequate coupling of the transducer 19 to the input of the two stage tuned amplifier which amplifies the echo signal to a level sufficient to operate the envelope detector. The gain reduction circuit attenuates the echoes from off-side lobes. The envelope detector provides AM demodulation of the echo signal and drives a pulse width filter with a time constant of the right magnitude to ensure that the return signal pulse be at least 100 microseconds wide for recognition. The transmitter-receiver circuitry operates at a frequency of 200 KHz. The ultrasonic transducer 19 is typical of those used in depth finding applications, and may have an operating frequency of 200 KHz, by way of example.

Figure 3:
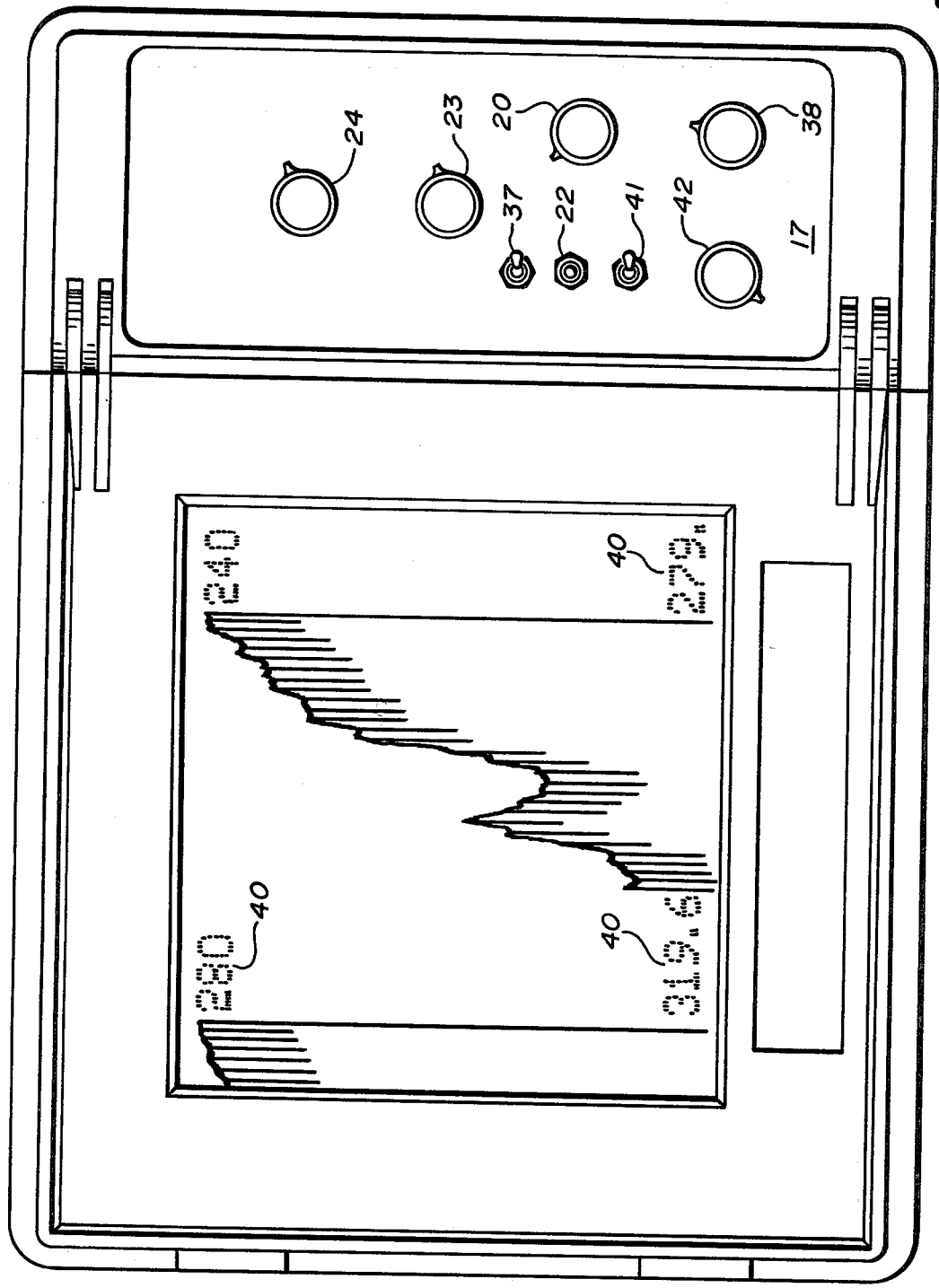
FIG. 3 is a front elevational view of the depth recorder, illustrating details of the control panel.

The echo pulses from the receiver circuitry are used to inform the MK-3870 microprocessor of the presence of submerged targets. Under normal operation, all returned signals are sent to the MK-3870 for processing. An important feature of the present invention resides in the introduction of a "dead space" or "white line" into the returned signal information, thereby allowing the identification of multiple targets which are close to each other in the vertical direction such as a school of fishes close to the seabed. The "white line" circuit illustrated in block form at 13 in FIG. 1 may consist of CMOS NOR gates connected in a monostable multivibrator configuration (not illustrated). When the circuit is enabled by the control 20, in control panel 17 (see FIG. 3), any echo will trigger the monostable which, in turn, will prevent any subsequent echoes in a predetermined, adjustable range from reaching the microprocessor. Since the inhibiting is done before the MK-3870 receives the echo pulses, the "white line" can be continuously variable in the ½ to 20 feet range without interference from the range selection switches.

Figure 2:
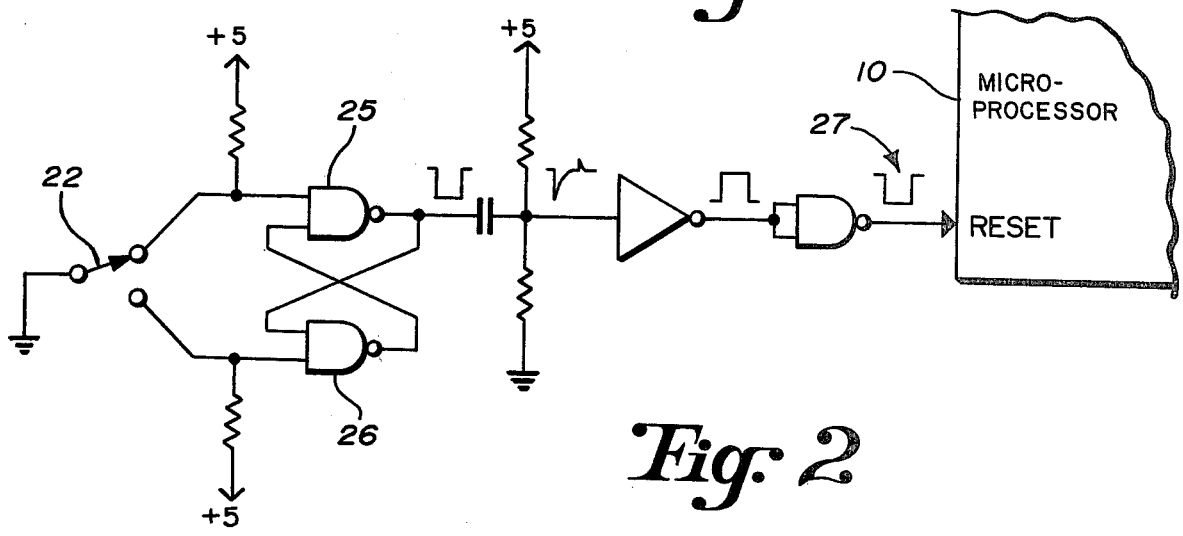
FIG. 2 is an electrical schematic diagram of the print request circuit.

Momentary print control switch 22 in control panel 17 (see FIG. 3) allows for printing, directly on the chart paper, of the proper range numbers for the range preselected by the corresponding range and scale switches 23 and 24, respectively. A vertical line also is printed in front of the range marks. In order to debounce the contacts of the mechanical "PRINT" switch 22, a circuit is used (see FIG. 2), which consists of a pair of cross-coupled NAND gates 25, 26 followed by a pulse shaping network which puts out a 20 microsecond wide pulse 27 in the appropriate direction to reset the MK-3870 microprocessor 10. This external reset causes the microprocessor to start at ROM memory location 0000 (hexadecimal).

Figure 5:
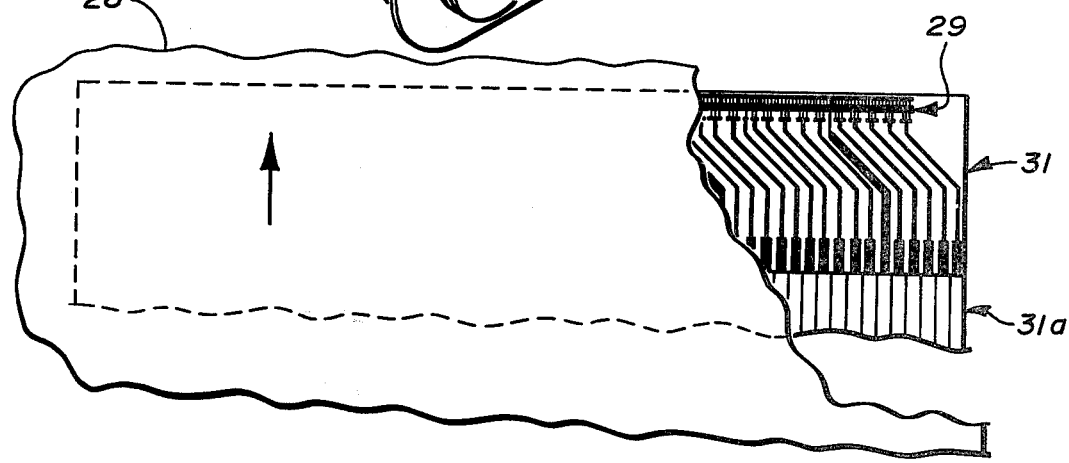
FIG. 5 is a fragmentary, enlarged view, as seen from the chart paper side and with portions broken away, illustrating details of the thermal print head assembly.

A salient feature of the invention resides in the method of printing the output data onto the chart paper (see FIGS. 4 and 5). The system uses a continuous roll of white, thermally-sensitive paper 28 which turns a deep blue when the surface temperature reaches 80° C. No preprinted markings appear on the 6 inch wide paper since all the information is printed, on command, by the MK-3870. The printing mechanism consists of 110 thick film resistors 29 arranged on a straight line along the width of the chart paper, each of which resistors serves to print a dot of a composit image. The 110 resistors are divided into two groups of 55 elements each, each group being located on the underside of a pair of end-to-end corresponding printing head assemblies 30, 31 which are kept pressed against the chart paper by spring tension (see FIG. 4) and connected to the remainder of the circuitry through multiple conductor connector strips 30a, 31a. A rubber roller 32 is located underneath the printing heads, and the thermal paper 28 is made to pass between the heads and the roller. The resistive elements are made according to standard thick film techniques on a ceramic substrate. Because of the small physical size of the print-out resistors, the type of resistive materials used and their substrate, and the heat dissipation characteristics of the chart paper to be printed upon, there is a limit to the power that can be used for their heating. Going beyond this limit can damage in the printing head assemblies. Present day practical speeds are approximately 7 to 10 milliseconds. Since the speed of sound through water is approximately 4800 feet per second, each foot distance that sound travels down and is echoed back up to the surface takes approximately 0.4 milliseconds. It is therefore apparent that if there are very many echoes to be charted, the thermal print speed cannot keep pace with possible speeds of returned echoes, and all echoes cannot be printed at the instant that they are received. The microprocessor comprising the present invention, which has RAM memory and is a read/write type, makes it possible to print such echoes at the slower rate compatible with thermal print head usage. Echoes are received and recorded in relation to the time recorded from the transmit pulse. The echoes are then taken out of memory and printed at a speed within the thermal print head capabilities.

Whenever a resistance element is activated, approximately 12 volts is applied across the element for a period not in excess of 10 milliseconds. This brings the temperature of the element to about 125° C., which causes a reaction to occur in the paper thereby turning the area under the element a deep blue. The paper temperature threshold is 80° C. A duty cycle of no more than 10% for the printing operation is determined by the microprocessor to avoid degrading the resistance elements.

Figure 6:
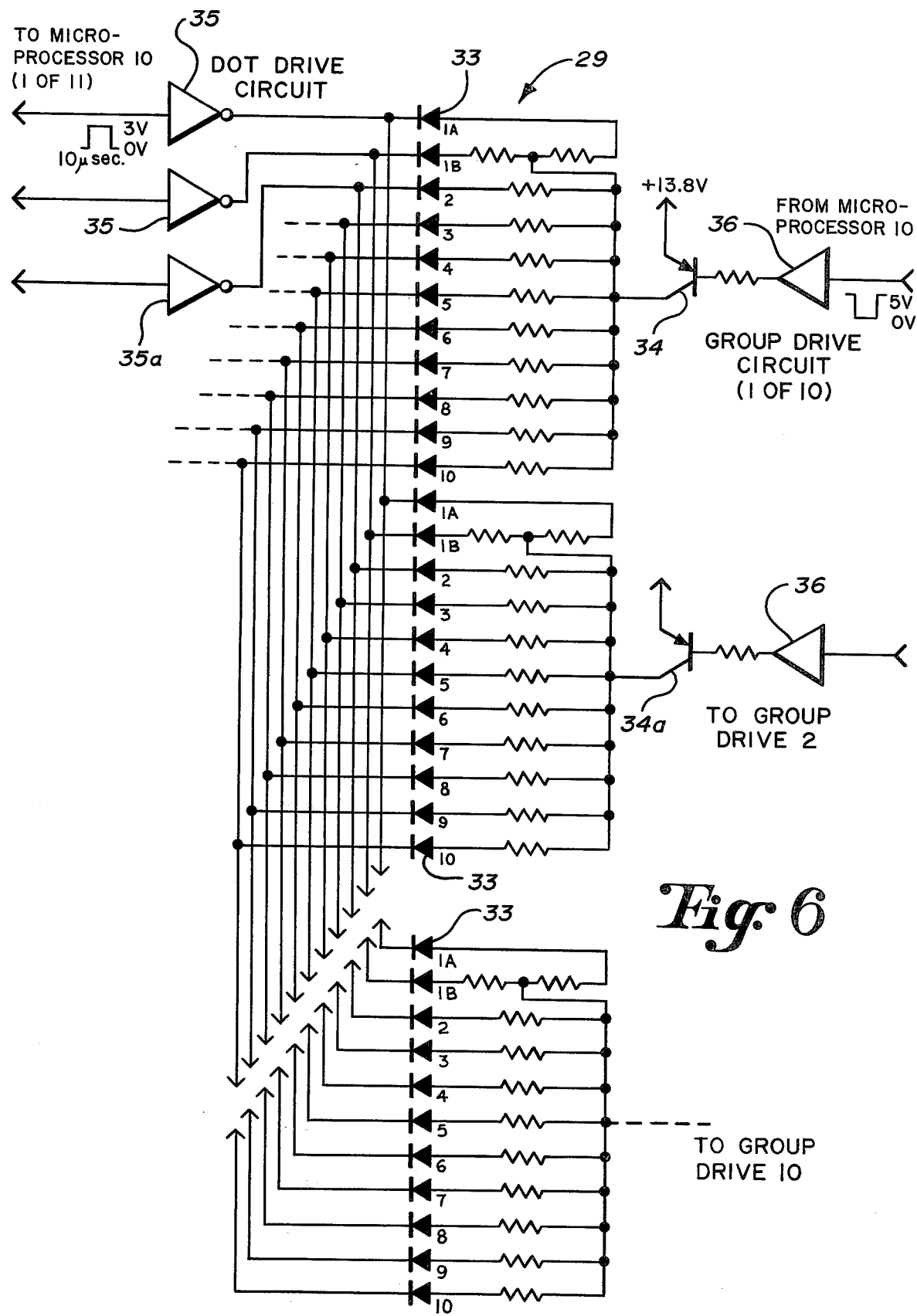
FIG. 6 is a schematic diagram of the thermal print-head drive circuitry.

In order to be able to individually select any one of the 110 resistive elements of the printing head assemblies 30, 31 without resorting to the use of 110 individual lines, a multiplexing technique is used (see FIG. 6). The number of control lines from the microprocessor and the number of driving components is thereby reduced from 110 to 21.

The 110 elements are divided into 10 groups of 11 dots each (dots 1A, 1B and 2 through 10) as illustrated in FIG. 6. A diode 33 is connected in series with each of the 110 elements, thus preventing interaction of the selected element with those not selected. One side of all the resistor dot elements in a group is connected together and to the collector of a PNP driver transistor 34. On the other side, the cathodes of all the diodes connected in series with the same dot resistor element in each group are connected together and to the output of an inverting buffer 35.

In operation, if dot 2 of group 2 is to be activated for 10 milliseconds, the number 2 dot inverting buffer 35a is driven by a positive-going pulse from the microprocessor, thereby placing the cathode of all the diodes connected to the number 2 resistive dot elements at ground potential. At the same time, the PNP drive resistor 34a connected to the number 2 dot group is turned on by the microprocessor through a buffer driver 36, thereby placing one side of all the resitive dot elements in group 2 at 12 volts. In this manner, a path exists for current to flow through the second resistive dot element of the corresponding print-head assemblies 30, 31 from the 12 volt supply to ground, and a dot is printed in that position.

From the above description, it will be readily apparent that a sophisticated print-out format can be achieved, since virtually any character can be printed rapidly and effectively. In operation, the depth range selected by the front panel switch 23 is divided into 100 intervals which can be individually printed on the chart. By splitting the first dot resistive element in each dot group into resistive elements 1A and 1B as illustrated in FIG. 6, grid lines every ten divisions, if called for, can be continuously printed along with the echo information, (the splitting of the first dot elements accounts for the 11 dots per group format). Grid line printing is controlled by panel switch 41. Furthermore, control of the printing mechanism and the high resolution provided by the one hundred dot elements allows alphanumeric characters 40 to be crisply printed along with the echo information (see FIG. 3), under control of momentary print control switch 22 as described above. Panel rheostat 42 controls a variable intensity chart light for viewing at night.

The chart paper 28 in the system is advanced under microprocessor control through the use of a conventional four-phase stepping motor 16a with shaft rotation of 7.5° per step. Two paper speeds are provided: a normal speed of approximately 0.75 inches per minute and a fast speed of 3 inches per minute. These speeds are, of course, for typical bottom conditions. A front panel switch 37 selects whether the chart speed is to be normal or fast. After selecting the desired speed, the MK-3870 microprocessor provides the required driving waveforms (see FIG. 1) to advance the stepping motor paper drive one step (approximately the width of one dot element). If normal speed is selected, drive to the stepping motor is provided after every six transmit cycles; if fast speed is selected, driving of the stepping motor is effected at the end of every transmit cycle.

In operation of the depth finder system, control of the microprocessor operations is accomplished by adjustment of the various switches or control of the front panel as hereinabove described. The current status of the control switches is determined by the MK-3870 microprocessor by sending a strobe pulse to sense their condition (see FIG. 1).

In addition to the above mentioned function control switches, a receiver signal gain control 38 is also provided in the front panel 21.

A salient feature of the depth finding system resides in the expanded scale feature manually controlled by front panel scale selection switch 24, which allow any 10% section of the selected range to be displayed across the entire 6 inches width of the chart paper. The system can be made to operate at any one of four ranges: 0–50 feet, 0–100 feet, 0–200 feet or 0–400 feet. The last three ranges can be expanded to display any 10% segment. For instance, in the 100 feet range, the 60 to 70 feet sector can be displayed along, allowing 100 print points to represent 10 feet of depth. In the 0 to 400 feet range, any 40 feet section can be displayed full scale.

While I have illustrated and described herein only one form in which my invention can conveniently be embodied in practice, it is to be understood that this form is presented by way of example only and not in a limiting sense. My invention, in brief, comprises all the embodiments and modifications coming within the scope and spirit of the following claims.

What I claim as new and desire to secure by Letters Patent is:

1. An aquatic depth recorder system comprising, in combination, means for producing high frequency sound impulses and periodically transmitting said impulses through the water at predetermined time intervals, means for receiving high frequency sound impulses (echoes) reflected from a number of reflecting objects, means for producing return signals which are each coincident in time to one of said high frequency sound impulses, means for producing a predetermined clock frequency, thermally-sensitive paper strip chart recorder means, said strip chart recorder means comprising a plurality of heat-producing resistors arranged in a straight line transversely of the direction of movement of strip chart paper to be recorded on, electrical current drive means for selectively energizing said heat-producing resistors, said thermally-sensitive paper strip chart recorder means comprising drive means for step-wisely advancing the strip chart paper, a microprocessor, manually adjustable function control means for said microprocessor, said microprocessor being programmed: (a) to key the periodic transmission of said high frequency sound impulses producing means, (b) measure the time elapsed between the transmission of the high frequency sound impulse and the reception of the reflected sound impulse (echo), (c) store such elapsed time in memory, (d) decode such time intervals into printing format, (e) read said manual function control means, (f) control the energization of said strip chart paper step-wise drive means and, (g) to selectively activate said electrical current drive means for said heat-producing resistors, all at a rate related to said clock frequency, for periodically printing values of said return signals on said strip chart paper between said step-wise movements thereof, said plurality of heat-producing resistors comprising ten groups of eleven heat-producing resistors each, and said electrical drive means for selectively energizing said heat-producing resistors comprising multiplexed individual resistor group and individual group resistor signal pathways.

2. An aquatic depth recorder system as defined in claim 1, wherein said microprocessor has RAM memory, whereby the echoes can be taken out of memory for printing at a speed within the printing speed capabilities of said heat producing resistors.

3. An aquatic depth recorder system as defined in claim 2 wherein said adjustable function control means for said microprocessor comprises means for printing any one, selectively, of a plurality of various depth recording ranges.

4. An aquatic depth recorder system as defined in claim 3 wherein said adjustable function control means further comprises means for selectively expanding selected ones of said ranges.

5. An aquatic depth recorder system as defined in claim 3 wherein said manually adjustable function control means comprises means for selectively printing grid lines on said chart paper.

6. An aquatic depth recorder system as defined in claim 3 wherein said manually adjustable function control means comprises means for selectively printing range numbers on said chart paper.

7. An aquatic depth recorder system as defined in claim 1 wherein the eleventh heat producing resistor of each of said groups serves as a printing element of said grid lines printing means.

* * * * *